(12) United States Patent
Krakowski et al.

(10) Patent No.: US 8,303,384 B2
(45) Date of Patent: Nov. 6, 2012

(54) DEVICE FOR MIXING FRESH AIR AND HEATING AIR AND USE OF THE DEVICE IN A VENTILATION SYSTEM OF AN AIRCRAFT

(75) Inventors: Dariusz Krakowski, Buxtehude (DE); Uwe Buchholz, Bliedersdorf (DE); Nico Centofante, Hamburg (DE)

(73) Assignee: Airbus Deutschland GmbH, Hamburg (DE)

( * ) Notice: Subject to any disclaimer, the term of this patent is extended or adjusted under 35 U.S.C. 154(b) by 676 days.

(21) Appl. No.: 12/296,190

(22) PCT Filed: Apr. 5, 2007

(86) PCT No.: PCT/EP2007/003147
§ 371 (c)(1),
(2), (4) Date: Mar. 20, 2009

(87) PCT Pub. No.: WO2007/115810
PCT Pub. Date: Oct. 18, 2007

(65) Prior Publication Data
US 2009/0165878 A1    Jul. 2, 2009

(30) Foreign Application Priority Data
Apr. 11, 2006  (DE) .......................... 10 2006 017 004

(51) Int. Cl.
*B64D 13/00*    (2006.01)
(52) U.S. Cl. ......................................... 454/76; 454/160
(58) Field of Classification Search .................. 261/115; 454/71, 76, 906; 137/340, 602, 888, 896; 366/107; 239/431
See application file for complete search history.

(56) References Cited

U.S. PATENT DOCUMENTS

| | | | | |
|---|---|---|---|---|
| 1,473,449 A | * | 11/1923 | Stearns et al. | 261/115 |
| 1,677,265 A | | 7/1928 | Boving | |
| 2,562,918 A | * | 8/1951 | Hynes | 454/74 |

(Continued)

FOREIGN PATENT DOCUMENTS
DE    2046254    4/1971
(Continued)

OTHER PUBLICATIONS

Liu Y, Modified solvent free epoxy binder and application as laminate layer of reinforced glass-fiber plastic material for corrosion protection of pipe, CN 1872937 A.*

(Continued)

*Primary Examiner* — Steven B McAllister
*Assistant Examiner* — Jamil Decker
(74) *Attorney, Agent, or Firm* — Wood Herron & Evans LLP

(57) ABSTRACT

A device for mixing fresh air and heating air in a ventilation system of an aircraft includes a fresh air inlet, a heating air supply body for supplying the heating air into the device, and a mixed air outlet for delivering mixed fresh air and heating air from the device. The heating air supply body includes a first portion and a second portion which constitute a flow resistance to the fresh air. The second portion is formed as a closed hollow body with a plurality of heating air supply openings and is connected to the first portion at a downstream end of the first portion, viewed in the flow direction of the heating air. Advantageously, the first portion of the heating air supply body is of streamlined shape.

12 Claims, 4 Drawing Sheets

U.S. PATENT DOCUMENTS

| | | | | |
|---|---|---|---|---|
| 2,586,002 | A * | 2/1952 | Carson, Jr. et al. | 62/150 |
| 2,917,288 | A * | 12/1959 | Sims, Jr. et al. | 165/235 |
| 2,953,078 | A * | 9/1960 | Best | 454/71 |
| 2,960,020 | A * | 11/1960 | Best | 454/71 |
| 3,261,329 | A * | 7/1966 | Withers, Jr. | 122/379 |
| 3,332,442 | A | 7/1967 | Reed | |
| 3,742,985 | A * | 7/1973 | Rubenstein | 138/141 |
| 4,026,527 | A | 5/1977 | Costen | |
| 4,073,832 | A * | 2/1978 | McGann | 261/118 |
| 4,330,376 | A * | 5/1982 | Lal et al. | 205/118 |
| 4,445,342 | A * | 5/1984 | Warner | 62/172 |
| RE32,100 | E * | 4/1986 | Rannenberg | 62/80 |
| 4,610,772 | A * | 9/1986 | Palnik | 204/206 |
| 5,025,831 | A * | 6/1991 | Wong et al. | 137/561 A |
| 5,176,325 | A * | 1/1993 | Vidusek | 239/419.3 |
| 5,287,694 | A | 2/1994 | Davis et al. | |
| 5,579,809 | A * | 12/1996 | Millward et al. | 138/174 |
| 5,649,568 | A * | 7/1997 | Allen et al. | 138/137 |
| 5,934,083 | A * | 8/1999 | Scherer et al. | 62/79 |
| 5,935,490 | A | 8/1999 | Archbold et al. | |
| 6,024,639 | A | 2/2000 | Scherer et al. | |
| 6,139,423 | A * | 10/2000 | Wadey | 454/142 |
| 6,189,324 | B1 * | 2/2001 | Williams et al. | 62/172 |
| 6,306,032 | B1 * | 10/2001 | Scheffler et al. | 454/71 |
| 6,375,849 | B1 * | 4/2002 | Crabtree et al. | 210/652 |
| 6,483,700 | B1 * | 11/2002 | Malone et al. | 361/690 |
| 6,568,203 | B1 * | 5/2003 | Leathers | 62/402 |
| 6,646,197 | B1 * | 11/2003 | Cugalj et al. | 174/355 |
| 6,887,435 | B1 | 5/2005 | Albrecht et al. | |
| 7,044,214 | B2 * | 5/2006 | Leathers | 165/299 |
| 7,871,038 | B2 * | 1/2011 | Space et al. | 244/118.5 |
| 2004/0129166 | A1 * | 7/2004 | Kellner | 102/516 |
| 2004/0256497 | A1 * | 12/2004 | Sharkey | 239/569 |
| 2005/0045416 | A1 * | 3/2005 | McCarty | 181/224 |
| 2005/0061913 | A1 | 3/2005 | McColgan et al. | |
| 2006/0112954 | A1 * | 6/2006 | Feria | 126/378.1 |
| 2008/0271465 | A1 * | 11/2008 | Mossberg et al. | 62/5 |
| 2008/0299887 | A1 * | 12/2008 | Scherer et al. | 454/71 |
| 2009/0084896 | A1 * | 4/2009 | Boucher et al. | 244/118.5 |
| 2009/0221224 | A1 * | 9/2009 | Centofante | 454/76 |

FOREIGN PATENT DOCUMENTS

| | | |
|---|---|---|
| DE | 4208442 | 4/1993 |
| EP | 875777 A2 * | 11/1998 |
| EP | 0885871 | 12/1998 |
| EP | 1677265 A1 * | 7/2006 |
| FR | 2001694 | 9/1969 |
| GB | 1329121 | 9/1973 |
| JP | 57187627 | 11/1982 |
| JP | 58026925 | 2/1983 |
| JP | 59063432 | 4/1984 |
| JP | 2005016686 | 1/2005 |
| SU | 334432 | 4/1972 |
| WO | 2005030582 | 4/2005 |

OTHER PUBLICATIONS

Isaev V P et al., Tight pipe-shell contains bearing external layer with collar, internal layer with annular protrusions and additional collar, between which tight layer is installed, RU 2340826 C2.*

International Search Report Forms: PCT/ISA/220, PCT/ISA/210, PCT/ISA/237.

English translation of Decision to Grant a Patent for Invention, Russian Patent Office, Mar. 15, 2011.

English translation of Office Action Summary, Japan Patent Office, Jul. 31, 2012.

* cited by examiner

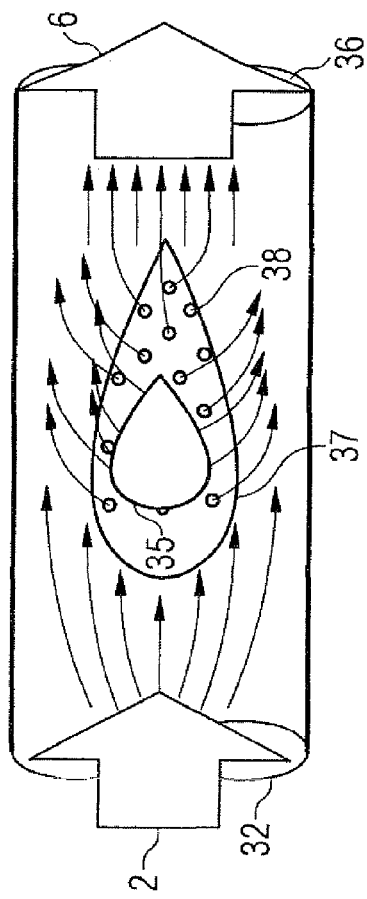
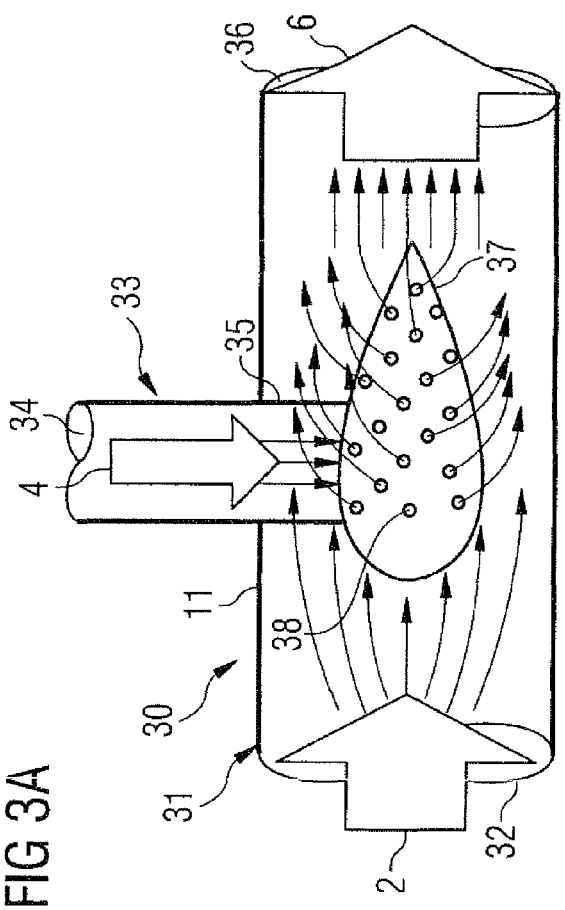
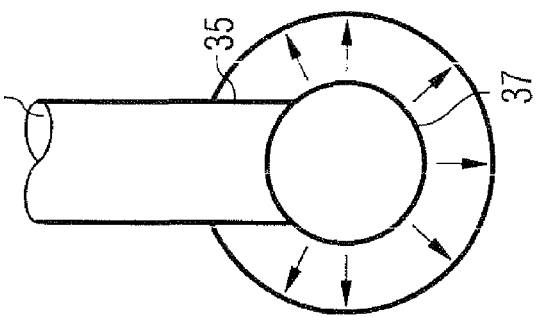

DEVICE FOR MIXING FRESH AIR AND HEATING AIR AND USE OF THE DEVICE IN A VENTILATION SYSTEM OF AN AIRCRAFT

This application claims the benefit of International Application No. PCT/EP2007/003147, filed on Apr. 5, 2007, and German Application No. DE 10 2006 017 004.0, filed on Apr. 11, 2006.

TECHNICAL FIELD

The present invention relates to a device for mixing fresh air and heating air. The invention also relates to the use of a device of this kind in a ventilation system installed on board of an aircraft. A conventional mixing device described in further detail with reference to FIGS. 1 and 2 below is known from DE 42 08 442 A1.

BACKGROUND

In modern civil commercial aircrafts, the aircraft cabin is divided into several areas which ought/must be ventilated and temperature-controlled independently of one another. Thus, the temperature control can be made dependent on the number of passengers in different areas of the aircraft cabin, for example. This requirement gave rise to the necessity of mixing the fresh air for each of these areas, which are to be temperature-controlled differently, before being fed into the aircraft cabin with a heating air flow whose quantity is regulated according to the temperature level which is to be reached in the respective cabin area.

Previous air mixers, i.e. devices for mixing fresh air and heating air, entailed the problem of the mixing process causing an appreciable increase in the pressure loss in the air supply pipes of the aircraft cabin. As the pressure in these pipes is subject to pressure regulation, the process of mixing fresh air and heating air acts as a disturbance variable on this pressure regulation, which must be minimised. Moreover, heating air is normally fed from a pipe of titanium alloy into a fresh air pipe of glass-fibre reinforced plastics material (GFRP composite), in which the mixing process then takes place. As the temperature of the heating air lies in a range from approximately 200° C. to 260° C. before being fed into the fresh air pipe, a fresh air pipe produced as a GFRP composite cannot withstand the high temperature of the unmixed hot air flow. It is therefore necessary to ensure efficient mixing of the two air flows and a temperature drop associated therewith. Furthermore, the heating air mass flow which is fed into the air supply line of the cabin is regulated with the aid of a temperature sensor which is installed downstream of the mixing zone. A homogeneous temperature profile must therefore be ensured in the air supply line located downstream of the mixing zone in order that the sensor can measure a representative temperature of the mixed air flow.

The mixing process usually takes place either without an auxiliary body (FIG. 1) or with a simply formed auxiliary body (FIG. 2). In case of the air mixer 10 which is illustrated in FIG. 1, fresh air 2 enters the pipe 11 through an inlet opening 12 and is mixed here with heating air 4 which is supplied through a supply opening 14. The mixed air 6 emerges from the outlet 16 of the air mixer 10 and is fed into the aircraft cabin downstream. In this case, a temperature sensor 18 which measures the temperature of the mixed air 6, is located downstream of the mixing zone. A disadvantage of the air mixer 10 of FIG. 1 lies in the insufficient mixing of fresh air 2 and heating air 4, in particular when the heating air flows are small. The insufficient mixing results in the formation of so-called "hot spots", which are of disadvantage for the pipe 11 made of a GFRP composite.

An air mixer 20 with an auxiliary body 24 is shown in FIG. 2. A perforated pipe end piece 24 is inserted laterally in the pipe 21 in this air mixer 20. The perforated pipe end piece 24 comprises a plurality of heating air supply openings 25 through which the heating air 4 passes into the pipe 21 and is mixed here with the fresh air 2 entering through the inlet 22. The mixed air 6 emerges from the pipe 21 through the outlet 26. The temperature of the mixed air 6 is again measured by means of a temperature sensor 28. A disadvantage of this air mixing lies in the fact that high pressure losses occasionally occur in the mixing zone, these being caused on the one hand by the reduction of the flow cross section of the pipe 21 in the area of the perforated pipe end piece 24, and on the other by the additional mass flow of heating air 4 entering in this area. As the flow speed in the area of the reduced flow cross section is higher than in other areas with a larger flow cross section, the pressure drops in an area of this kind. Moreover, the additional heating air mass flow 4 brings about a pressure drop in the pipe 21 in the area of the perforated pipe end piece 24. This pressure drop is of disadvantage for the pressure regulation in the fresh air supply lines of the aircraft cabin.

It is therefore an object of the present invention to propose a device with which the process of mixing fresh air and heating air can be carried out with low pressure losses and with a high mixing quality, in particular when large heating air mass flows are to be admixed with the fresh air flow.

SUMMARY OF THE INVENTION

This object is achieved by a device which comprises a fresh air inlet (32, 42), a heating air supply body (33, 43) for supplying the heating air (4) into the device (30, 40), and a mixed air outlet (36, 46) for delivering mixed fresh air and heating air (6) from the device (30, 40), wherein the heating air supply body (33, 43) comprises a first portion (35, 45) and a second portion (37, 47) which constitute a flow resistance to the fresh air (2), and wherein the second portion (37, 47) is formed as a closed hollow body with a plurality of heating air supply openings (38, 48) and is connected to the first portion (35, 45) at a downstream end of the first portion, viewed in the flow direction of the heating air. According to the invention, in order to achieve the above-mentioned object, the first portion (35, 45) of the heating air supply body (33, 43) is of streamlined formation.

In this connection streamline form is understood to be any form of a body which is distinguished by a low flow resistance with respect to the medium flowing around it, in this case air. Because the heating air supply body is at least partially of streamlined configuration, the proportion by which the flow cross section of the fresh air pipe is reduced by the heating air supply body is maintained at a minimum, so that the pressure drop associated therewith can in turn be maintained at a low level in this area. Moreover, pressure losses in the fresh air line are also minimised in case of large heating air flows which are supplied by means of the heating air supply body of the fresh air line.

According to a preferred embodiment of the invention, the second portion of the heating air supply body which comprises a plurality of heating air supply openings is of streamlined formation. A heating air supply body which is formed in this way is also called an effusion body, into the interior of which the heating air is introduced and removed through the heating air supply openings into the interior of the air mixer.

The second portion of the heating air supply body, which comprises the heating air supply openings, may preferably also be of spherical or elliptical formation. The spherical or elliptical configuration of the second portion is still of advantage in that it maintains the flow resistance and the pressure drop associated therewith at low level in the interior of the air mixer.

According to another preferred embodiment of the invention, the cross-sectional area of the first portion in the flow direction of the fresh air may be smaller than the cross-sectional area of the second portion. On the one hand, this results in a reduction of the flow resistance of the first portion relative to the second portion. On the other hand, the heating air supply openings which are provided at the first portion of the heating air supply body can be distributed over a larger area, thereby improving the quality of mixing of the heating air and the fresh air, as the fresh air can more easily access the heating air.

The plurality of heating air supply openings at the second portion can preferably be uniformly distributed. This uniform distribution of the heating air supply openings ensures that the heating air will emerge uniformly into the air mixer, and significant temperature gradients in proximity of the second portion, which could lead to an inhomogeneous temperature profile downstream of the mixing zone, are thus prevented.

According to a further preferred embodiment of the invention, the number of heating air supply openings in a downstream area of the second portion may be greater than in an upstream area of the second portion. Since the exit direction of the heating air is opposite to the flow direction of the fresh air in the upstream area of the second portion, the heating air must "work" against the air flow upon emerging from the second portion. This work would have to be supplied to the system in form of energy. In contrast to this, the exit direction of the heating air in the downstream area of the second portion is parallel to the flow direction of the fresh air. For this reason, the number of heating air supply openings in the downstream area of the second portion is greater than in the upstream area.

A surface density of the heating air supply openings at the second portion can preferably increase in the flow direction of the fresh air. The pressure loss occurring in the mixing process is thereby further minimised for the above-mentioned reason.

According to another preferred embodiment of the invention, a flow direction of the heating air in the first portion of the heating air supply body can be perpendicular to the flow direction of the fresh air. On account of the perpendicular arrangement of the first portion of the heating air supply body, when introduced into the second portion, thus forming an effusion body, the heating air already has a movement component perpendicular to the flow direction of the fresh air which makes it easier for the heating air to emerge from the effusion body, in particular in case of small heating air flows. After the heating air has emerged from the effusion body, the heating air is pushed in the flow direction of the fresh air, and while the heating air changes its direction of movement, it can mix with the fresh air, so that the mixing quality is further improved.

According to a further preferred embodiment of the invention, a first body of the air mixer can comprise the fresh air inlet and the mixed air outlet, in which case the heating air supply body can be fastened to the first body. On account of this construction, the first body comprising the fresh air inlet and the mixed air outlet can be made of a different, lightweight material, which is of particular advantage in aircraft construction.

According to another preferred embodiment of the invention, with regard to a weight-saving construction of the air mixer, the first body can be made of a titanium alloy and the heating air supply body of a glass-fibre reinforced plastics material. The titanium alloy guarantees good thermal stability with respect to the high temperatures of the heating air, and the glass-fibre reinforced plastics material is of advantage in particular with regard to a weight-saving construction of the overall air mixer.

A temperature sensor can preferably be disposed on the first body downstream of the heating air supply body, this being of advantage in particular with regard to specific temperature regulation of the mixed air to be supplied to the aircraft cabin. The temperature sensor should in this case be disposed at a sufficient distance from the mixing zone in order that the sensor can measure a representative temperature level of the mixed air.

The invention also provides the use of a device according to the invention of this kind in a ventilation system installed on board of an aircraft.

BRIEF DESCRIPTION OF THE DRAWINGS

The invention is illustrated by way of example in the following on the basis of the accompanying schematic figures, in which:

FIGS. 3A, 3B, 3C represent different views of an air mixer according to a first embodiment of the invention;

DETAILED DESCRIPTION

Figure 1:
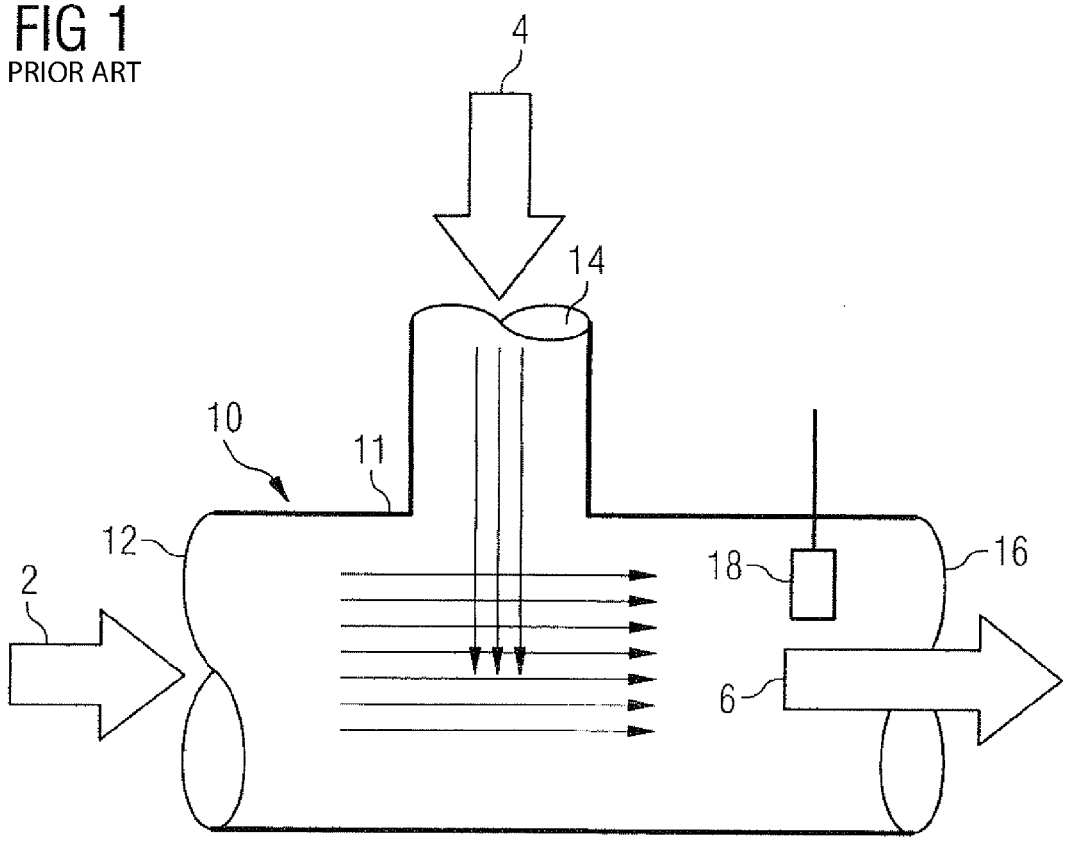
FIG. 1 represents a cross section of an air mixer without an auxiliary body according to the prior art.
Figure 2:
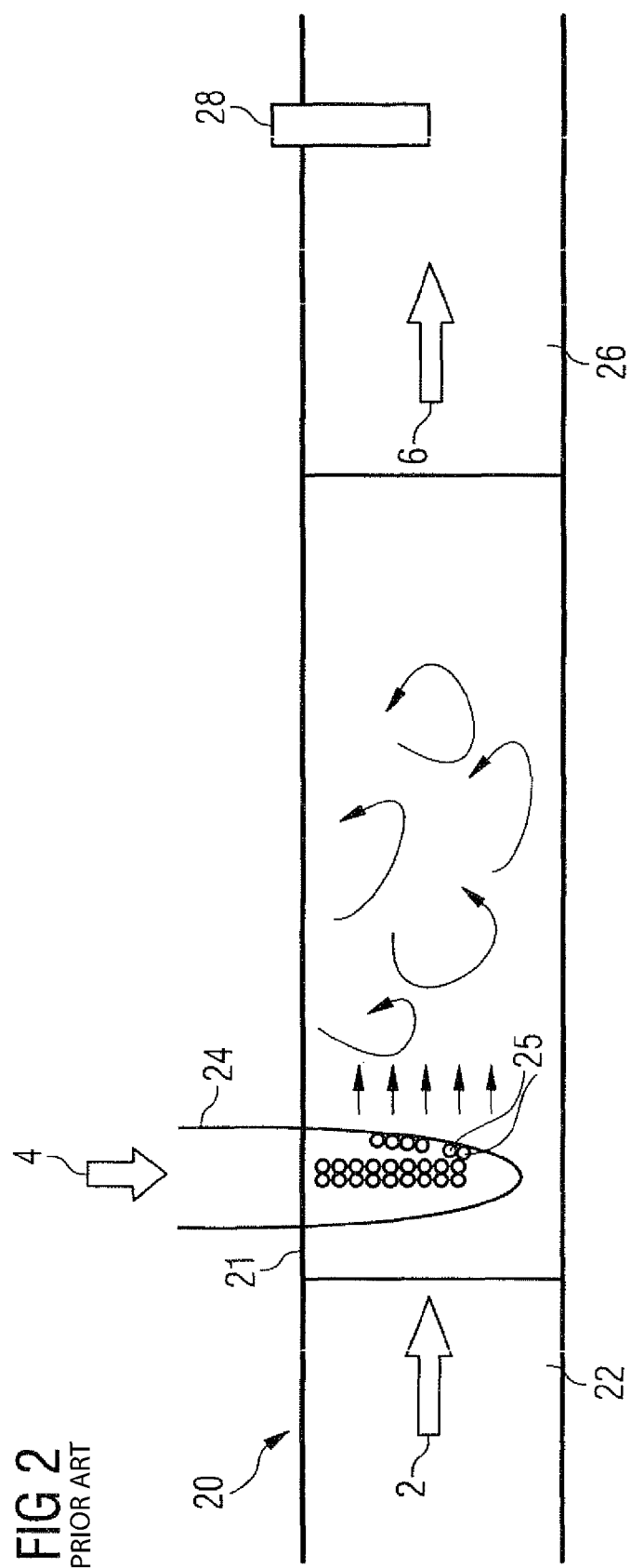
FIG. 2 represents a cross section of an air mixer with an auxiliary body according to the prior art.

The reference numerals which are used in FIGS. 3A, 3B and 3C as well as 4A, 4B and 4C correspond in part to those of FIG. 1 and FIG. 2. In addition, in FIGS. 3A, 3B, 3C and FIGS. 4A, 4B and 4C, components of the air mixer according to the first and the second embodiment of the invention which correspond to one another are denoted by reference numerals which differ only by the first digit.

FIG. 3A represents a side view, FIG. 3B a plan view and FIG. 3C a cross-sectional view perpendicularly to the flow direction of the fresh air of an air mixer 30 according to a first embodiment of the invention. In this embodiment, fresh air 2 enters a cylindrically formed pipe 31 through an inlet opening 32. Although in FIG. 3A the inlet opening 32 is represented as a section through the pipe 31, and although the inlet opening 32 may also lie at another point in the longitudinal direction of the pipe 31, this section is to be understood as the inlet 32 within the meaning of the invention.

The heating air 4 to be mixed with the fresh air 2 enters the heating air supply body 33 through an inlet 34. The heating air supply body 33 shown in FIGS. 3A, 3B and 3C basically comprises two portions. A first portion 35 is of streamlined formation and serves as a supply line to the second portion 37. The second portion 37 is hollow and is referred to as an effusion body within the meaning of the invention. The effusion body 37 has a plurality of heating air supply openings 38 through which the heating air 4 can emerge into the interior of the pipe 31. In this case, the heating air 4 emerges in the direction normal to the surface of the effusion body 37 (see FIG. 3C) and, after emerging from the effusion body 37, is pushed by the fresh air 2 in the flow direction of the fresh air 2 and mixed with the fresh air 2. The heating air 4 which is mixed with the fresh air 2 emerges from the pipe 31 through the mixed air outlet 36 as mixed air 6.

FIG. 3B represents a plan view of the air mixer 30. As can be seen in FIG. 3B, both the first portion 35 of the heating air supply body 33 and the effusion body 37 are of streamlined formation in relation to the flow direction of the fresh air 2. More specifically, each of the first portion 35 and the effusion body 37 defines an elliptical shape or a teardrop shape as shown in FIGS. 3A and 3B. On account of the streamline form of the first portion 35 and of the effusion body 37, there is a reduction in the flow resistance of the heating air supply body 33 in relation to the flow direction of the fresh air, so that pressure losses upon mixing of the fresh air 2 and the heating air 4 in the air mixer 30 are minimized. The streamline form of the supply line (i.e., first portion) 35 and of the effusion body 37 additionally ensures that no flow separation occurs at the downstream end of the heating air supply body 33.

The cross-sectional area of the first portion 35 in the flow direction, i.e. the area of the portion 35 in the drawing plane of FIG. 3B, is smaller than the cross-sectional area of the effusion body 37. As a result, the flow resistance of the heating air supply body 33 is further reduced and a pressure drop associated therewith is further minimised. At the same time, good intermixing is achieved, even in the case of small heating air flows emerging from the heating air supply openings 38 of the effusion body 37 into the air mixer 30.

In the embodiment shown in FIGS. 3A, 3B and 3C, the distribution of the heating air supply openings 38 at the effusion body 37 is selected such that, with the exception of the upstream area, the heating air supply openings 38 are distributed substantially uniformly at the surface of the effusion body 37. No heating air supply openings are provided in the area of the upstream end of the effusion body 37, as the exit direction of the heating air in this area would be opposite to the flow direction of the fresh air. The heating air would therefore have to work against the fresh air, work which would have to be supplied to the system in form of energy. In contrast to this, in the downstream area, the exit direction of the heating air 4 emerging from the heating air supply openings 38 is parallel to the flow direction of the fresh air 2, and the pressure drop upon mixing is therefore distinctly diminished in this downstream area. The heating air 4 emerging from the heating air supply openings 38 perpendicularly to the flow direction of the fresh air 2, i.e. in the vicinity of the equator of the effusion body 37, ensures that there is no bypass flow in relation to the effusion body 37. Instead, fresh air 2 is also mixed with heating air 4 in the area of the pipe 31 near its edge. The result is a substantially homogeneous temperature profile over the cross section of the pipe 31. This homogeneous temperature profile permits representative temperature measurements by a temperature sensor, which is not shown in FIGS. 3A, 3B and 3C, and therefore reliable regulation or control of the temperature level of the mixed air 6 emerging from the air mixer 30 and being supplied to the aircraft cabin is ensured.

Figure 4C:
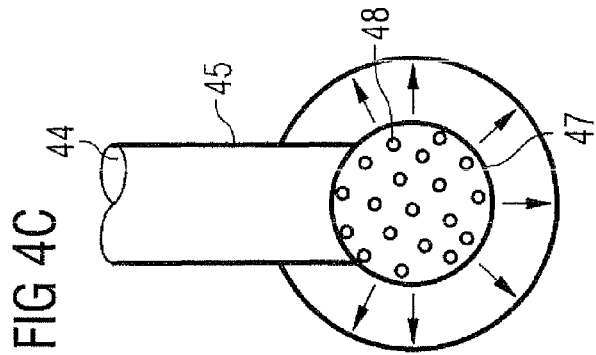
FIGS. 4A, 4B, 4C represent different views of an air mixer according to a second embodiment of the invention.
Figure 4A:
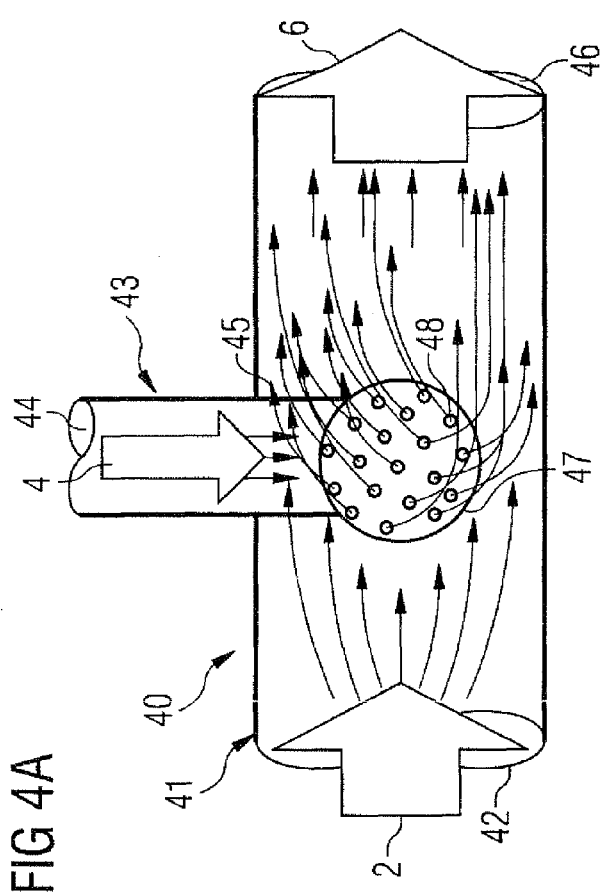
Figure 4B:
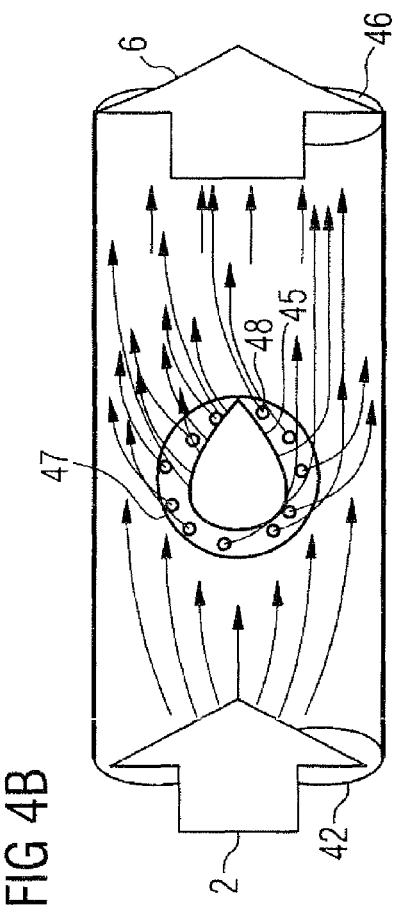

FIG. 4A represents a side view, FIG. 4B a plan view and FIG. 4C a cross-sectional view perpendicularly to the flow direction of the fresh air 2 of an air mixer 40 according to a second embodiment of the invention. In this connection, only the differences relative to the first embodiment represented in FIGS. 3A, 38 and 3C are discussed.

In this embodiment of the air mixer 40, the effusion body 47 is of spherical formation. The heating air supply openings 48 are uniformly distributed at the surface of the effusion body 47 in this embodiment. The heating air 4 accordingly emerges uniformly from the effusion body 47 in all directions. Although the effusion body 47 does not have a streamline form in the actual sense, the flow resistance of the effusion body 47 is, however, reduced when compared with the perforated pipe end piece 24 of FIG. 2. Similarly to the first embodiment shown in FIGS. 3A, 3B and 3C, the supply line 45 is in the same way of streamlined formation, as can be seen in FIG. 4B. As a result, any pressure losses occurring in the air mixer 40 are also maintained at a low level in the embodiment shown in FIGS. 4A, 4B and 4C.

The heating air supply body 33, 43 is disposed perpendicularly to the flow direction of the fresh air 2 in both embodiments which are represented here. In other words, the flow direction of the heating air 4 in the heating air supply bodies 33, 43 is perpendicular to the flow direction of the fresh air 2 in the pipe 31, 41. In order to be able to withstand the relatively high temperatures of the heating air 4 (in the range from 200° C. to 260° C.), the heating air supply body 33, 43 is advantageously made of a titanium alloy. With regard to a weight-saving construction of the air mixer 30, 40, which is particularly important in aircraft construction, the pipe 31, 41 is made of a glass-fibre reinforced plastics material (GFRP composite). However, the person skilled in the art is aware that other suitable materials for the pipe 31, 41 as well as the heating air supply body 33, 43 may be used.

The heating air supply body 33, 43 is inserted in a lateral opening of the pipe 31, 41 and connected to the latter in an airtight manner. For example, a metal socket with an internal thread can be inserted in the lateral opening of the GFRP pipe 31, 41. The heating air supply body 33, 43, made of a titanium alloy and comprising an external thread (not shown), can then be screwed into the socket.

The effusion body 37, 47 is advantageously welded to the streamline-shaped supply line 35, 45.

The possibility of the heating air supply openings 38, 48 at the effusion body 37, 47 being distributed in a way different to that shown in FIGS. 3A, 3B, 3C and 4A, 4B, 4C has also been taken into account in the case of the two embodiments which are represented here. It has thus been determined that no heating air supply openings are provided in the upstream area of the effusion body 37, in particular in the embodiment which is shown in FIGS. 3A, 3B and 3C. This represents a compromise, as, although improved mixing could theoretically be achieved on account of the higher streamline density in this area, the exit direction of the heating air 4 in this area is opposite to the flow direction of the fresh air 2, and the heating air 2 would therefore have to perform work against the fresh air 2. This work would have to be externally supplied to the system in the form of energy.

In addition, the width of the effusion body 37, 47 in both embodiments, as seen in the flow direction of the fresh air, can be selected such that it corresponds to the width of the heating air supply body 33, 43.

The air mixer 30, 40 which is described here in connection with FIGS. 3A, 3B, 3C and 4A, 4B and 4C is particularly suitable for fitting in a ventilation system installed on board of a commercial aircraft. It is also conceivable to use the air mixer 30, 40 at another location, e.g. in ventilation systems of trains, lorries or buses, i.e. wherever air flows at different temperatures are to be mixed with one another as effectively as possible and with as low a pressure loss as possible in order, for example, to be able to ventilate, adjust and control the temperature level of different areas of a cabin compartment or cargo compartment.

The invention claimed is:

1. A device for mixing fresh air and heating air in a ventilation system installed on board an aircraft, the device comprising:
   a fresh air source and a source of heating air;
   a fresh air inlet fluidly connected with the fresh air source to supply the fresh air, a heating air supply body supplying the heating air from the source of heating air, and a mixed air outlet for delivering mixed fresh air and heating air from the device, wherein the heating air supply body includes a first portion and a second portion which constitute a flow resistance to the fresh air, wherein the second portion is formed as a closed hollow body with a plurality of heating air supply openings and is connected to the first portion at a downstream end of the first portion, viewed in the flow direction of the heating air, wherein the number of heating air supply openings in a downstream area of the second portion is greater than in an upstream area of the second portion, and a surface density of the heating air supply openings at the second portion increases in the flow direction of the fresh air, and wherein the first portion is formed as a supply line extending into the device to the second portion, the supply line defining, as seen in the flow direction of the fresh air, a streamlined shape in the form of a teardrop cross-section.

2. The device according to claim 1, wherein the second portion defines a streamlined shape viewed in the flow direction of the fresh air.

3. The device according to claim 1, wherein the second portion is of spherical or elliptical shape.

4. The device according to claim 2, wherein the cross-sectional area of the first portion in the flow direction of the fresh air is smaller than the cross-sectional area of the second portion.

5. The device according to claim 2, wherein the plurality of heating air supply openings at the second portion are uniformly distributed.

6. The device according to claim 2, wherein the number of heating air supply openings in a downstream area of the second portion is greater than in an upstream area of the second portion.

7. The device according to claim 2, wherein the second portion defines a teardrop shape defined along a flow direction of the fresh air.

8. The device according to claim 2, wherein a flow direction of the heating air in the first portion of the heating air supply body is perpendicular to the flow direction of the fresh air.

9. The device according to claim 1, further comprising:
a first body including the fresh air inlet and the mixed air outlet, wherein the heating air supply body is fastened to the first body.

10. The device according to claim 9, wherein the first body is made of a glass-fibre reinforced plastics material and the heating air supply body is made of a titanium alloy.

11. The device according to claim 9, wherein a temperature sensor is disposed on the first body downstream of the heating air supply body.

12. A method for mixing fresh air and heating air in a ventilation system installed on board an aircraft, the method comprising:

installing a device in the ventilation system, the device comprising a fresh air inlet fluidly connected to a source of fresh air, a heating air supply body supplying the heating air from a source of heating air, and a mixed air outlet for delivering mixed fresh air and heating air from the device, wherein the heating air supply body includes a first portion and a second portion which constitute a flow resistance to the fresh air, wherein the second portion is formed as a closed hollow body with a plurality of heating air supply openings and is connected to the first portion at a downstream end of the first portion, viewed in the flow direction of the heating air, wherein the number of heating air supply openings in a downstream area of the second portion is greater than in an upstream area of the second portion, wherein a surface density of the heating air supply openings at the second portion increases in the flow direction of the fresh air, and wherein the first portion is formed as a supply line extending into the device to the second portion, the supply line defining, as seen in the flow direction of the fresh air, a streamlined shape in the form of a tear drop cross-section;

delivering fresh air through the fresh air inlet into the device; and delivering heating air through the heating air supply body into the device for mixing with the fresh air and discharge at the mixed air outlet.

* * * * *